(12) United States Patent
Samoto et al.

(10) Patent No.: US 7,838,633 B2
(45) Date of Patent: Nov. 23, 2010

(54) METHOD FOR PRODUCTION OF FRACTIONATED SOYBEAN PROTEIN MATERIAL

(75) Inventors: Masahiko Samoto, Tsukubamirai (JP);
Mitsutaka Kohno, Izumisano (JP)

(73) Assignee: Fuji Oil Company, Limited, Osaka (JP)

( * ) Notice: Subject to any disclaimer, the term of this patent is extended or adjusted under 35 U.S.C. 154(b) by 0 days.

(21) Appl. No.: 12/448,070

(22) PCT Filed: Dec. 6, 2007

(86) PCT No.: PCT/JP2007/073598

§ 371 (c)(1),
(2), (4) Date: Jun. 5, 2009

(87) PCT Pub. No.: WO2008/069273

PCT Pub. Date: Jun. 12, 2008

(65) Prior Publication Data

US 2010/0022754 A1 Jan. 28, 2010

(30) Foreign Application Priority Data

Dec. 6, 2006 (JP) .............................. 2006-329745

(51) Int. Cl.
*A23J 3/16* (2006.01)
(52) U.S. Cl. .................................................... 530/378
(58) Field of Classification Search ................. 426/656, 426/598, 634; 530/378
See application file for complete search history.

(56) References Cited

U.S. PATENT DOCUMENTS

| | | | |
|---|---|---|---|
| 6,171,640 | B1 | 1/2001 | Bringe |
| 6,638,562 | B1 | 10/2003 | Saitoh et al. |
| 2004/0028799 | A1 | 2/2004 | Ishikawa et al. |
| 2006/0073252 | A1 | 4/2006 | Ishikawa et al. |
| 2006/0223985 | A1 | 10/2006 | Baba et al. |

FOREIGN PATENT DOCUMENTS

| | | |
|---|---|---|
| EP | 0 072 094 | 9/1986 |
| JP | 48-56843 | 8/1973 |
| JP | 49-31843 | 3/1974 |
| JP | 55-124457 | 9/1980 |
| JP | 58-36345 | 3/1983 |
| JP | 61-187755 | 8/1986 |
| JP | 2003-284504 | 10/2003 |
| JP | 2003-289812 | 10/2003 |
| WO | 00/58492 | 10/2000 |
| WO | 02/28198 | 4/2002 |
| WO | 2004/043160 | 5/2004 |
| WO | 2005/055735 | 6/2005 |

OTHER PUBLICATIONS

International Search Report issued Mar. 11, 2008 in European Application No. PCT/JP2007/073598.
K. Yagasaki et al., "Potential Improvement of Soymilk Gelation Properties by Using Soybeans with Modified Protein Subunit Compositions", Breeding Science, vol. 50, pp. 101-107, 2000.
T. Okita et al., "Effects of Dietary Soybean Globulins on Plasma and Liver Lipids and on Fecal Excretion of Neutral Sterols in Rats", J. Nutr. Sci. Vitaminol., vol. 27, No. 4, pp. 379-388, 1981.
V. H. Thanh et al., "Major Proteins of Soybeans Seeds. A Straightforward Fractionation and Their Characterization", J. Agric. Food Chem., vol. 24, No. 6, pp. 1117-1121, 1976.
E. M. Herman, "Immunogold-Localization and Synthesis of an Oil-Body Membrane Protein in Developing Soybean Seeds", Planta, vol. 172, pp. 336-345, 1987.
M. Samoto et al., "Simple and Efficient Procedure for Removing the 34 kDa Allergenic Soybean Protein, Gly m 1, from Defatted Soy Milk", Biosci. Biotech. Biochem., vol. 58, No. 11, pp. 2123-2125, 1994.
M. Samoto et al., "Improvement of the Off-flavor of Soy Protein Isolated by Removing Oil-body Associated Proteins and Polar Lipids", Biosci. Biotechnol. Biochem. vol. 62, No. 5, pp. 935-940, 1998.
T. Nagano et al.,"Relationship Between Rheological Properties and Conformational States of 7S Globulin From Soybeans at Acidic pH", Food Hydrocolloids: Structures, Properties, and Functions, Plenum Press, New York, 1994.

*Primary Examiner*—Tekchand Saidha
(74) *Attorney, Agent, or Firm*—Wenderoth, Lind & Ponack, L.L.P.

(57) ABSTRACT

The object is to fractionate 7S-globulin as well the remaining acid-precipitatable proteins from a soybean with efficiency and at high purities, and provide a highly pure fractionated soybean protein material. Specifically disclosed is a method for producing a fractionated soybean protein material, which comprises the steps of: 1) extracting a protein from a soybean having a 7S-globulin content of 20 wt % or more and a 11S-globulin content of 10 wt % or less relative to the total amount of proteins, thereby producing a soybean protein solution; 2) adjusting the pH value of the soybean protein solution to 4 to 5.5, and heating the resulting solution at 40 to 65° C.; and 3) adjusting the pH value of the heated soybean protein solution to a value ranging from 5.3 to 5.7 and higher than the pH value at the time of the heating the solution, and fractionating the resulting solution into a water-soluble fraction and a water-insoluble fraction.

1 Claim, 2 Drawing Sheets

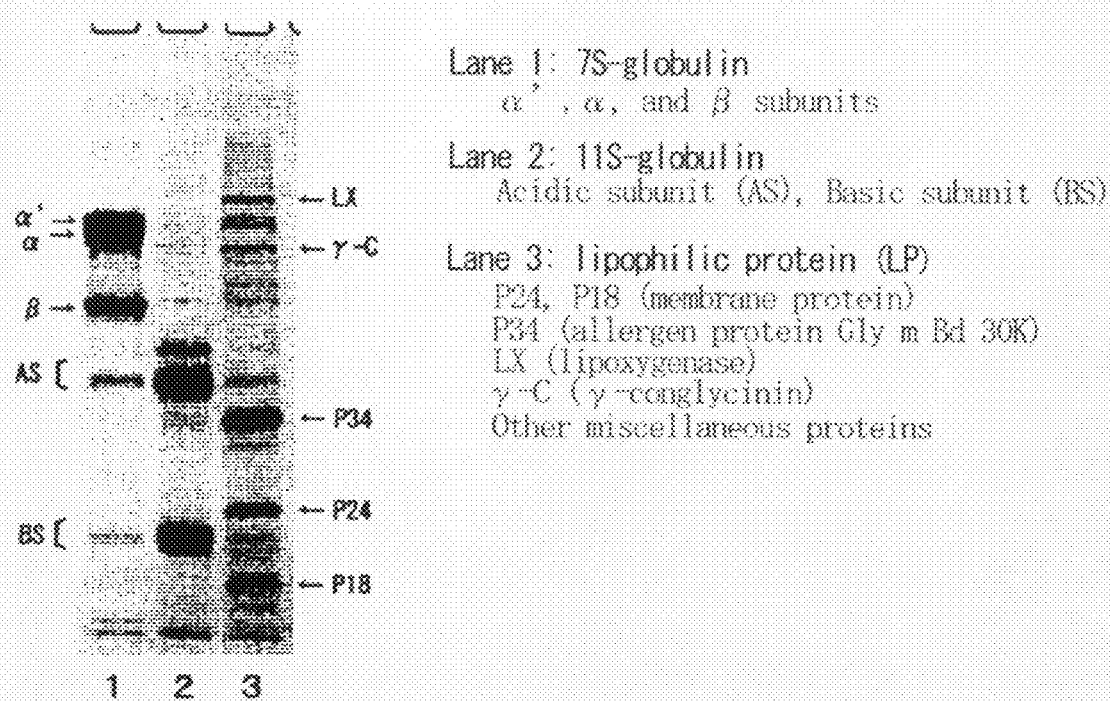

METHOD FOR PRODUCTION OF FRACTIONATED SOYBEAN PROTEIN MATERIAL

This application is a U.S. national stage of International Application No. PCT/JP2007/073598 filed Dec. 6, 2007.

TECHNICAL FIELD

The present invention relates to a method for producing a fractionated soybean protein material. More particularly, the present invention relates to a fractionation technique of 7S-globulin and a lipophilic protein each of which is one of soybean proteins having characteristic properties.

BACKGROUND ART

Soybean proteins have been widely utilized for improving physical properties of foods because of their peculiar gelling property, and at the same time, use of soybean proteins as highly nutritious health food materials has been increased.

A storage protein of a soybean is precipitated at around pH 4.5, and therefore soybean proteins can be relatively simply separated into an acid-soluble protein fraction mainly containing soluble components other than a storage protein and an acid-precipitable protein fraction mainly containing a storage protein. The acid-precipitable protein fraction is collected to obtain an isolated soybean protein, which has been currently widely used in the food industry.

Soybean proteins are classified into 2S-globulin, 7S-globulin, 11S-globulin and 15S-globulin based on sedimentation coefficient by ultracentrifuge analysis. Among them, 7S-globulin and 11S globulin are the main constituent protein components of a globulin fraction. Herein, β-conglycinin and glycinin according to immunological nomenclature substantially correspond to 7S-globulin and 11S-globulin respectively.

Soybean proteins are each different in physical properties such as viscosity, coagulation property and surface activity, and nutritional physiological functions.

For example, it has been reported that 7S-globulin decrease neutral fat in blood (see Non-Patent Document 1). It has been believed that 11S-globulin has a high gelling activity and governs the hardness and mouth feeling of a bean curd gel.

Thus, a fractionation of soybean proteins into fractions rich in these components enables physiological functions or physical properties peculiar to each protein component to greatly manifest, probably leading to creation of a characteristic material. Therefore, extension of the field utilizing soybean protein in the food industry can be expected.

As seen from FIG. 1 showing dissolution behavior of 7S-globulin and 11S-globulin for a pH, 7S-globulin has a low solubility at about pH 4.8 and 11S-globulin has a low solubility at from pH 4.5 to 6. Thus, it is expected that respective components with a high purity may be fractionated by first precipitating 11S-globulin at about pH 6 and then further lowering pH to precipitate 7S-globulin.

However, in fact, when soybean milk is adjusted to pH 6 and separated into an insoluble fraction and a water-soluble fraction, and then, these fractions are subjected to SDS-polyacrylamide gel electrophoresis, the obtained electrophoresis patterns show that considerable amounts of 7S-globulin and 11S-globulin are mixed in both fractions.

For this reason, there is a problem that only a simple fractionation based on dissolution behavior of both globulins for a pH can not obtain their fractions with a high purity.

In order to overcome such a problem, some techniques for fractionation of 7S-globulin and 11S-globulin have been disclosed (see Non-Patent Document 2, Patent Documents 1 to 7 etc.).

On the other hand, it has been reported in recent years that acid-precipitable soybean proteins comprise various proteins having high affinity for polar lipids which constitute the membrane of a protein body, an oil body and the like including a cell membrane, in addition to 7S-globulin and 11S-globulin (see Non-Patent Document 3).

Considering such a report, the present inventors have studied. As a result, they have found that when sodium sulfate is added to low-denatured defatted soybean milk so as to be a 1M concentration and the soybean milk is then adjusted to pH 4.5 with hydrochloric acid, 7S- and 11S-globulins transfer into an acid-soluble fraction and other various proteins transfer into an acid-precipitable fraction (see Non-Patent Document 4).

It has also been found that the nitrogen amount of the acid-precipitable fraction accounted for about 30% of the total nitrogen amount in the defatted soybean milk, which is an unexpected large amount.

Further, it has been reported that industrially produced isolated soybean proteins contain about 35% of these various proteins, and it has been found that such a group of proteins influence the flavor of conventional soybean protein materials such as soybean milk or isolated soybean protein (see Non-Patent Document 5).

The acid-precipitable fraction that is not rich in 7S-globulin and 11S-globulin comprises proteins having mainly a deduced molecular weight of 34 kDa, 24 kDa and 18 kDa based on SDS-polyacrylamide electrophoresis, lipoxygenase, γ-conglycinin and other many various proteins.

Such a group of proteins have affinity for a polar lipid, therefore, they are called lipophilic proteins.

According to the above-described findings, it is understood that the previous fractionation techniques (Non-Patent Document 2, Patent Documents 1 to 7) can not substantially attain fractionation of 7S-globulin and 11S-globulin with a high purity because it is not considered at all that lipophilic proteins account for a considerable proportion of an acid-precipitable soybean protein fraction.

Although Non-Patent Document 4 has shown a method for fractionation of 7S-globulin, 11S-globulin and a lipophilic protein with a high purity, said method needs use of a large amount of a reducing agent under a high ionic strength and thus needs a desalting step and a washing step. Therefore, said method is effective at the experimental level, but is not suitable for an industrial process.

Then, the present applicant has developed a technique for fractionating soybean proteins into a soybean 7S-globulin protein fraction with a high purity which has a low content rate of a lipophilic protein, and a soybean 11S-globulin protein fraction (see Patent Documents 8 and 9). Said method has been industrially excellent in that 7S-globulin with a high purity can be fractionated. However, on the other hand, a troublesome procedure is needed in order to fractionate a mixture of 11S-globulin and the lipophilic protein, which is the remaining fraction, into each component with a high purity. Therefore, it has been in the situation that these components are not effectively utilized.

That is, not a method for fractionation of only 7S-globulin with a high purity, but a simple method for fractionation of the remaining fraction with a high purity is desired.

(Reference Documents)

Non-Patent Document 1: Okita T et al., J. Nutr. Sci. Vitaminol., 27(4), 379-388, 1981

Non-Patent Document 2: Thanh, V. H, and Shibasaki, K., J. Agric. Food Chem., 24, 1117-1121, 1976

Non-Patent Document 3: Herman, Planta, 172, 336-345, 1987

Non-Patent Document 4: Samoto M et al., Biosci. Biotechnol. Biochem., 58(11), 2123-2125, 1994

Non-Patent Document 5: Samoto M et al., Biosci. Biotechnol. Biochem., 62(5), 935-940, 1998

Non-Patent Document 6: T. Nagano, et al., Relationship between rheological properties and conformational states of 7S globulin from soybeans at acidic pH, Food Hydrocolloids: Structures, Properties, and Functions, Plenum Press, New York, 1994

Patent Document 1: JP 55-124457 A

Patent Document 2: JP 48-56843 A

Patent Document 3: JP 49-31843 A

Patent Document 4: JP 58-36345 A

Patent Document 5: JP 61-187755 A

Patent Document 6: WO 00/58492 A1

Patent Document 7: U.S. Pat. No. 6,171,640 B1

Patent Document 8: WO 02/28198 A1

Patent Document 9: WO 2004/43160 A1

DISCLOSURE OF THE INVENTION

Problems to be Solved by the Invention

In view of the above-described problems, an object of the present invention is to provide highly pure fractionated soybean protein materials, by fractionating not only 7S-globulin, but also remaining acid-precipitable proteins from a soybean effectively and with a high purity.

Means for Solving the Problems

Previously, the present applicant has invented the technique which can fractionate 7S-globulin, 11S-globulin, and a lipophilic protein efficiently and with a high purity by a simple procedure, by preparing a processed soybean obtained by subjecting a low-denatured soybean to denaturation treatment under such a condition that only a lipophilic protein is selectively denatured, and extracting the obtained raw material (International Application No.: PCT/JP2006/310751).

The previous invention exhibits the effect of improving particularly separation of proteins into 11S-globulin and the lipophilic protein by the above-described denaturation treatment. This finding has been further developed, and this leads to the finding that, if a soybean originally having a low content of 11S-globulin is used, 7S-globulin and the lipophilic protein can be fractionated efficiently and with a high purity by a simple procedure, without carrying out the above-described denaturation treatment, and an idea of the present invention has been obtained.

That is, the present invention for solving the above-described problems is:

1. A method for producing a fractionated soybean protein material, comprising the steps of:
    1) extracting proteins from a soybean having a 7S-globulin content of 20 wt % or more and a 11S-globulin content of 10 wt % or less relative to the total amount of proteins to produce a soybean protein solution,
    2) adjusting the pH value of the soybean protein solution to 4 to 5.5, and heating the solution at 40 to 65° C., and
    3) adjusting the pH value of the heated soybean protein solution to a pH value ranging from 5.3 to 5.7 and higher than the pH value at the time of heating the solution, and fractionating the solution into a water-soluble fraction and a water-insoluble fraction;

2. A method for producing a soybean 7S-globulin protein material, comprising adjusting the pH value of the water-soluble fraction according to 1, to 4 to 5, and recovering the water-insoluble fraction;

3. A method for producing a non-7S/11S-acid-precipitable soybean protein material, comprising recovering the water-insoluble fraction according to 1.

Effect of the Invention

According to the efficient and simple method of the present invention, it is possible to fractionate 7S-globulin and a lipophilic protein with a high purity, respectively. The resulting fractions can be provided as a soybean 7S-globulin protein material and a 7S/11S-acid-precipitable soybean protein material, respectively, and can be utilized sufficiently exploiting the respective physical properties and nutrient physiological functions.

Since said fractionation method comprises mainly adjustment of pH without addition of a salt unlike a conventional fractionation method comprising addition of a salt, it does not need a dilution step and a desalting step for realizing a low ion concentration environment necessary for recovering proteins as a precipitate. Therefore, said fractionation method is an excellent method in which an operation for fractionation is simplified.

BEST MODE FOR CARRYING OUT THE INVENTION

First, terms as used in the present invention will be explained.

The "7S globulin" is also referred to as β-conglycinin, and is a glycoprotein which is generally composed of three kinds of subunits (α', α, β), and any of subunits may be lacked. These subunits are randomly combined to form a trimer. 7S globulin has an isoelectric point of around pH 4.8 and a molecular weight of about 170,000. Hereinafter, 7S globulin is simply abbreviated as "7S" in some cases.

The "soybean 7S protein" refers to a soybean protein material having an increased purity of 7S.

The "11S globulin" is also referred to as glycinin, and is a dodecamer formed of 6 molecules wherein a molecule consists of an acidic subunit and a basic subunit bound to each other via a disulfide bond. The molecular weight of 11S globulin is about 360,000. Hereinafter, 11S globulin is simply abbreviated as "11S" in some cases.

Both of 7S and 11S are acid-precipitable soybean proteins, and are main storage proteins which are stored in a soybean protein body.

The "acid-precipitable soybean protein" as used herein refers to a protein that is precipitated when the pH of a soybean protein solution such as defatted soybean milk is adjusted to an acidic side (pH 4 to 6), among soybean proteins. Therefore, for example, proteins comprised in an isolated soybean protein correspond to the acid-precipitable soybean protein, and proteins comprised in whey which are not acid-precipitated in the production of an isolated soybean protein are not included in the acid-precipitable soybean protein.

7S and 11S, depending on the varieties of soybeans, account for about 70% of all soybean proteins comprised in a conventional isolated soybean protein (SPI) or the like, as determined by measuring peak areas in SDS electrophoresis with a densitometry after Coomassie Brilliant Blue (CBB) staining.

Hereinafter, 7S and 11S are collectively abbreviated as "MSP" in some cases.

The "lipophilic protein" refers to a group of minor acid-precipitable soybean proteins other than 7S and 11S among acid-precipitable soybean proteins of a soybean, and is accompanied by a lot of polar lipids such as lecithin and glycolipid. Hereinafter, the lipophilic protein is simply abbreviated as "LP" in some cases.

The LP comprises proteins mainly having a presumed molecular weight of 34 kDa, 24 kDa and 18 kDa based on SDS-polyacrylamide electrophoresis, lipoxygenase, γ-conglycinin, and many other various proteins (see FIG. 2, lane 3).

As seen from FIG. 2, LP is difficult to stain in SDS electrophoresis as compared with 7S and 11S, so that the actual entity has not previously been recognized clearly. For this reason, bands on SDS electrophoresis described as a single band of 7S and 11S in previous literatures actually comprise a considerable amount of LP, in many cases.

The "non-7S/11S-acid-precipitable soybean protein" refers to a soybean protein material having an increased purity of LP. Hereinafter, the non-7S/11S-acid-precipitable soybean protein is simply abbreviated as "LP-SPI" in some cases.

Analysis of the total content of 7S and 11S in soybean proteins can be carried out according to the following (method 1) and (method 2).

In addition, since LP is a mixture of various proteins, it is difficult to specify all of respective proteins. However, LP can be fractionated based on dissolution behavior by (Method 1) and (Method 2) as described below.

(Method 1)

A processed soybean sample (in the case of a whole fat soybean, it is defatted with hexane to less than 1.5% of an oil content in advance) is ground, and is adjusted to a particle size of 60 mesh pass. To 1 part by weight of the soybean is added 7 parts by weight of water. The mixture is adjusted to pH 7.5 with sodium hydroxide, stirred at room temperature for 30 minutes, and then centrifuged at 1000 G for 10 minutes to be separated into a water-soluble fraction A and an insoluble fraction A. Further, 5 parts by weight of water is added to the insoluble fraction A, and stirred at room temperature for 30 minutes. The mixture is centrifuged at 1000 G for 10 minutes to be separated into a water-soluble fraction B and an insoluble fraction B. The water-soluble fractions A and B are mixed to obtain a water-soluble fraction. The insoluble fractions A and B are mixed to obtain an insoluble fraction. Operations from water addition to separation are carried out at 10° C. to 25° C. Stirring is carried out with a propeller (350 rpm).

(Method 2)

The water-soluble fraction obtained by Method 1 is adjusted to pH 4.5 by addition of hydrochloric acid. The mixture is centrifuged at 1000 G for 10 minutes and an insoluble fraction C is collected. Further, to the insoluble fraction C is added a 1M $Na_2SO_4$ (containing 20 mM mercaptoethanol) solution in an amount of 5 times the weight of the sample processed soybean used in Method 1. The mixture is stirred well, and centrifuged at 10000 G for 20 minutes to be separated into a water-soluble fraction D and an insoluble fraction D. The insoluble fraction D is subjected to the same operation as described above to be separated into a water-soluble fraction E and an insoluble fraction E. The insoluble fractions D and E are combined to obtain a LP fraction, and the water-soluble fractions D and E are combined to obtain a 7S and 11S fraction (MSP fraction). An operation temperature is 10° C. to 25° C. The nitrogen amounts of the LP fraction and the MSP fraction thus obtained are measured by a Kjeldahl method, and the ratio between them is determined.

Then, a method of measuring the content of LP in a soybean protein material will be explained.

Since a soybean protein material is generally heat-sterilized in the final productization step, heating degeneration occurs in all of 7S, 11S and LP. For this reason, it is difficult to fractionate into 7S and 11S fractions and LP fraction from the soybean protein material after the final productization step by the above-described methods 1 and 2, and measure the LP content.

In the case of a SDS-polyacrylamide gel electrophoresis method (SDS-PAGE) which is a general method of measuring a protein composition, it is difficult to stain LP with CBB, and therefore it is also difficult to measure the precise LP amount by said method.

Thus, the following method which comprises easily selecting the main proteins contained in 7S, 11S and LP proteins, determining a staining ratio among them, and estimating the LP content from the ratio can be adopted.

[Method of Estimating LP Content]

(a) As the main proteins in respective proteins, an α subunit and an α' subunit (α+α') are selected for 7S, an acidic subunit (AS) is selected for 11S, and a 34 kDa protein and lipoxygenase (P34+Lx) are selected for LP. Then, a staining ratio among the selected proteins on SDS-PAGE is determined. Electrophoresis can be carried out under the condition shown in Table 1.

(b) $X(\%) = (P34+Lx)/\{(P34+Lx)+(\alpha+\alpha')+AS\} \times 100(\%)$ is calculated.

(c) Since the LP content of an isolated soybean protein prepared from a low-denatured defatted soybean is about 38% as measured by the fractionation methods of the above-described Methods 1 and 2 before heat-sterilization, (P34+Lx) is multiplied by a correction coefficient k*=6 so that X becomes 38(%).

(d) That is, an estimated LP content (Lipophilic Proteins Content Index, hereinafter abbreviated as "LCI") is calculated by the equation below.

TABLE 1

| Application amount: | 10 μl of a protein 0.1% sample solution per well |
|---|---|
| Well width: | 5 mm |
| Well volume: | 30 μl |

TABLE 1-continued

| | |
|---|---|
| Staining solution: | Coomassie Brilliant Blue (CBB) 1 g, methanol 500 ml, glacial acetic acid 70 ml (after CBB is completely dissolved in methanol, acetic acid and water are added to 1 L) |
| Staining time: | 15 hours |
| Discoloration time: | 6 hours |
| Densitometer: | GS-710 Calibrated Imaging Densitometer/Quantity One Software Ver.4.2.3 (Bio Rad Japan Co. Ltd) Scanning width: 5.3 mm, Sensitivity: 30 |

(Mathematical formula 1)

$$LCI\ (\%) = \frac{k* \times (P34 + Lx)}{k* \times (P34 + Lx) + (\alpha + \alpha') + AS} \times 100$$

k*: Correcting coefficient (6)
P34: LP main component, 34 kDa protein
Lx: LP main component, lipoxygenase
α: 7S main component, α subunit
α': 7S main component, α' subunit
AS: 11S main component, acidic subunit Then, embodiments of the present invention will be explained in detail.

The method for fractionation of soybean proteins of the present invention comprises the steps of: 1) extracting proteins from a soybean having a 7S-globulin content of 20 wt % or more and a 11S-globulin content of 10 wt % or less relative to the total amount of proteins, thereby producing a soybean protein solution; 2) adjusting the pH value of the soybean protein solution to 4 to 5.5, and heating the resulting solution at 40 to 65° C.; and 3) adjusting the pH value of the heated soybean protein solution to a value ranging from 5.3 to 5.7 and higher than the pH value at the time of heating the solution, and fractionating the resulting solution into a water-soluble fraction and a water-insoluble fraction.

[Raw Material Soybean]

As a raw material soybean used in the fractionation method of the present invention, a soybean having a 7S-globulin content of 20 wt % or more, preferably 30 wt % or more, and a 11S-globulin content of 10 wt % or less, preferably 5 wt % or less relative to the total amount of proteins is used. As such a soybean, particularly, a soybean from which 11S-globulin is removed by breeding or gene recombination technique, that is, a soybean having the 11S-globulin content of 0 wt % can be used. For example, a soybean described in US2004/0037905 A1 can be used.

In addition, in the case where various soybean protein materials of the present invention are prepared, it is preferable to use a defatted soybean as the raw material soybean because lipids contained in soybeans influence the purity of a protein obtained. A defatted soybean obtained by defatting a soybean with organic solvents such as hexane, or compressing a soybean to decrease the oil content, can be used.

The form of a defatted soybean as raw material is not particularly limited. Preferably a ground soybean is used, and suitably a soybean powder having a maximum particle diameter of 500 µm or less, more preferably 300 µm or less, further preferably 100 µm or less is used.

In addition, it is desirable that denaturation of proteins contained in a raw material defatted soybean has not extremely proceeded before a processing treatment in the present invention, and a soybean having PDI of 60 or more is preferable wherein PDI indicates a protein extraction rate. The moisture of the soybean is preferably 2 to 15%, more preferably 5 to 10%.

The present invention comprises a step of extracting proteins from the raw material defatted soybean to obtain a soybean protein solution. That is, the raw material soybean is dispersed in an aqueous solvent such as water or an alkaline aqueous solution to extract proteins, a bean curd refuse which is a water-insoluble fraction is removed from the extract by centrifugation, and a water-soluble fraction is recovered, thereby, a soybean protein solution is obtained.

The addition amount of the aqueous solvent is preferably 6 to 15 times, more preferably 7 to 12 times the weight of the raw material soybean. When the addition amount of the aqueous solvent is too small, the mixture has an increased viscosity, and when the addition amount of the aqueous solvent is too large, the mixture becomes a dilute solution, thereby the recovery efficiency of the soybean milk is decreased.

The temperature for extraction is preferably about 4 to 50° C., more preferably about 10 to 30° C. When the temperature is too high, proteins get denatured and are brought into a state where fractionation is difficult, and conversely, when the temperature is too low, the extraction efficiency is decreased.

Soybean curd refuse which is insoluble at around neutral pH 6 to 9 is removed from the resulting extract by centrifugation or the like. For the purpose of increasing the recovery amount of soybean milk, to the resulting soybean curd refuse may be further added a 4 to 6-fold weight of water followed by extraction, and such a procedure may be repeated.

The soybean protein solution obtained by such a process has an extremely characteristic composition unlike a solution extracted from a general defatted soybean, has an extremely low 11S-globulin content of 15 wt % or less, preferably 7% or less relative to the total amount of proteins.

Then, the pH value of the soybean protein solution is adjusted to 4 to 5.5, preferably 4.8 to 5.2, and is heated at 40 to 65° C. Then, the pH value of the heated soybean protein solution is adjusted to a value ranging from 5.3 to 5.7 and higher than the pH value at the time of heating the solution.

By such a process, LP can be selectively insolubilized while the soluble state of 7S is retained. In addition, a water-soluble fraction containing mainly 7S and a water-insoluble fraction containing mainly insolubilized LP can be fractionated by solid liquid separation.

When a water-soluble fraction after solid liquid separation contains very little whey component which has been washed and removed in advance before extraction, the fraction can be spray-dried as it is, thereby, a soybean 7S-globulin protein material can be obtained. In addition, when the water-soluble fraction contains a whey component, the purity of 7S is reduced by just as much. In this case, the pH value of the water-soluble fraction is further adjusted to 4 to 5, preferably 4.3 to 4.8, and the produced precipitate is recovered, thereby, a highly pure soybean 7S-globulin protein material can be obtained.

Since the purity of 7S of said material is as high as 80% or higher, use of the material exploiting the property peculiar to 7S is possible. For example, the material can be utilized in a nutrient functioning agent such as a blood neutral fat reducing agent or a body fat reducing agent, and a highly viscous material. Said material has a LCI value of 30% or less, more preferably 25% or less, further preferably 20% or less, an extremely small LP content, and an excellent flavor.

On the other hand, a water-insoluble fraction after solid liquid separation is recovered, neutralized with sodium hydroxide as necessary to prepare a neutralizing solution, sterilization-heated, and dried, thereby, a non-7S/11S-acid-precipitable soybean protein material (LP-SPI) containing LP at high purity can be obtained. The resulting LP-SPI can be provided as a high purity product having LCI of at least 60 wt % or more.

It has been believed that LP contributes to deterioration of the flavor of a conventional soybean protein material. However, a LP-SPI obtained by highly fractionating LP has various applications in which the property peculiar to LP is utilized.

The fractionated LP as described above has strong affinity for lipids. Therefore, whether a soybean protein material corresponds to the LP-SPI of the present invention or not can be determined by whether the content of an oil component in the protein is 7 wt % or more, preferably 8 to 15 wt %, more preferably 9 to 15 wt % wherein the oil component is extracted with a 2:1 mixture of chloroform methanol as a solvent (hereinafter, referred to as the "chloroform-methanol oil content"). However, when LP-SPI contains 2% or more of an oil component which is extracted with ether, the content of the ether-extracted oil component must be subtracted from a numerical value of the chloroform-methanol oil content. The extracted polar lipid comprises mainly lecithin and glycolipid.

Incidentally, conventional isolated soybean proteins which are not fractionated have a chloroform-methanol oil content of about 4 to about 5 wt %, and a high purity soybean 7S protein and a high purity soybean 11S protein have merely a chloroform-methanol oil content of 3% or less.

A particularly important function of LP-SPI is the blood cholesterol lowering action as described in International Application PCT/JP2006/310751, and a composition for lowering blood cholesterol such as an agent and a food utilizing the action can be provided.

The amount of LP-SPI to be contained in the blood cholesterol lowering composition can be appropriately determined depending on the form and amount of the composition. Usually, a person skilled in the art may determine the content of LP-SPI in the composition by considering the amount ingested per day of the composition so that the amount of an active ingredient to be ingested per day can be taken. For example, in the case where the amount of LP-SPI to be ingested per day is 4.5 g and the amount of the composition to be ingested per day is 10 g, the content of an active ingredient in the composition may be 45% by weight. The amount of LP-SPI of the present invention to be ingested per day is not particularly limited, but it can be 4 to 10 g.

The blood cholesterol lowering composition of the present invention can contain, in combination with LP-SPI, an ingredient which is said to have a blood cholesterol lowering activity. For example, isoflavone, soybean milk, an isolated soybean protein, a concentrated soybean protein, lecithin, a lactic acid bacterium, polyphenol, polysaccharide or the like can be contained.

When provided as a blood cholesterol lowering agent, the composition can be formulated into various dosage forms of preparations. In the case of oral administration, the composition of the present invention can be administered in a form of a solid preparation such as a tablet, a hard capsule, a soft capsule, a granule and a pill, or a liquid preparation such as a solution, an emulsion and a suspension. In the case of parenteral administration, the composition of the present invention is administered in a form of an injection solution, a suppository or the like. For formulation of these preparations, additives which are acceptable for formulation, for example, excipients, stabilizers, preservatives, wetting agents, emulsifiers, lubricants, sweeteners, coloring agents, flavors, tonicity regulating agents, buffers, antioxidants, pH adjusting agents and the like can be used in combination.

When provided as a food for lowering blood cholesterol, the composition of the present invention can be incorporated into various foods such as soft drinks, milk products, soybean milk, fermented soybean milk, soybean protein drinks, bean curd (tofu), fermented soybeans (natto), thin deep-fried bean curd (aburaage), thick deep-fried bean curd (atsuage), deep-fried bean curds containing bits of various kinds of vegetables (ganmodoki), hamburgers, meatballs, deep-fried chickens, nuggets, various daily dishes, confectionery such as baked confectionery, nutrient bars, cereals, candies, gums, jellies and the like, tablets, breads, cooked rice and the like, which are general forms of foods. Further, in the case of a food, the composition of the present invention can be also incorporated into health foods such as food for specified health use in Japan, and a package or an advertising medium such as a pamphlet of the food can indicate directly or indirectly that said food contains LP-SPI as an active ingredient and thereby said food has a blood cholesterol lowering activity.

Specific preparation examples for carrying out the present invention will be described below.

Preparation Example 1

Method of Preparing High Purity Soybean 7S-Globulin Protein Material

Using a soybean having a 7S-globulin content of 20 wt % or more and an 11S-globulin content of 10 wt % or less relative to the total amount of proteins, proteins are extracted from the soybean according to the above-described (Method 1), and a bean curd refuse is separated to obtain a soybean protein solution.

Then, the pH value of said soybean protein solution is adjusted to 5.0 with hydrochloric acid, the solution is heated at 60° C. for 15 minutes, the pH value is adjusted to 5.5 with sodium hydroxide, the solution is stirred (300 to 350 rpm) with a propeller for 30 minutes, and then a water-insoluble fraction A is separated by centrifugation at 1000 G for 10 minutes to recover a water-soluble fraction. The pH value of the fraction is adjusted to 4.5 with hydrochloric acid, and the resulted insoluble fraction B is recovered by centrifugation at 1000 G for 10 minutes, and spray-dried to obtain a soybean 7S-globulin protein material.

A purity test of this protein material is carried out by a method of subjecting 3.7 μg of a sample to SDS-polyacrylamide gel electrophoresis, development with SDS-PAGE, staining with Coomassie Brilliant Blue, and then subjected to a densitometer, and the proportion of the concentration of a band corresponding to 7S and 11S relative to the concentration of a band of the total proteins is calculated. In addition, the LCI value of these samples is obtained. According to the above-described test method, the purity of 7S prepared according to the present method is as high as 80% or more, and the LCI value is 30% or less, thus, LP is largely reduced.

Preparation Example 2

Method of Preparing LP-SPI

The water-insoluble fraction A obtained as in Preparation Example 1 is recovered, and spray-dried to obtain LP-SPI. An oil component contained in a solid content of this protein is a component in which the amount of an oil component extracted with ether is less than 2%, the amount of an oil component extracted with a mixed solvent having a ratio of chloroform:methanol of 2:1 is 7% or more, and a large amount of LP exhibiting affinity for a polar lipid is contained. The LCI value is as high as 60% or more.

Comparative Example 1

Using a commercially available 10M soybean (produced in USA) (having a 7S-globulin content of 18% and a 11S-globulin content of 36% relative to the total amount of proteins), proteins are extracted according to the (Method 1), and a bean curd refuse is separated to obtain a soybean protein solution.

Then, the solution is fractionated into a water-soluble fraction and a water-insoluble fraction A by the method same as that of Preparation Example 1. The pH value of the water-soluble fraction is adjusted to 4.5 with hydrochloric acid, and the resulted water-insoluble fraction B is recovered by centrifugation, and spray-dried to obtain a protein material. The 7S purity of the resulting protein material is 75% or less.

Comparative Examples 2 and 3

A fractionation is carried out in the same manner of Preparation Example 1 except that the pH value of the soybean protein solution obtained in Preparation Example 1 is adjusted to 3.5 (Comparative Example 2) and 6 (Comparative Example 3), respectively, and the solution is heated at 60° C. In both cases, water-soluble fraction with a high purity is not obtained, and the purity is less than 80%. It is thought that the recovery amount of the water-insoluble fraction A is reduced, and that an amount of solubilization of fractions to be recovered as LP is increased.

Comparative Examples 4 and 5

A fractionation is carried out in the same manner of Preparation Example 1 except that the pH value of the soybean protein solution obtained in Preparation Example 1 is adjusted to 5.0, and the solution is heated at 35° C. (Comparative Example 4) and 70° C. (Comparative Example 5), respectively. In this case, in the resulting water-soluble fraction, the purity of 7S is not increased at 35° C. On the other hand, the purity of 7S is increased at 70° C., but the yield is extremely reduced. In the water-insoluble fraction A, contamination of 7S is increased at 70° C., and neither of Comparative Examples 4 and 5 can be fractionated with a high purity.

Comparative Examples 6 and 7

A fractionation is carried out in the same manner of Preparation Example 1 except that the pH value of the soybean protein solution obtained in Preparation Example 1 is adjusted to 5.0, and heated at 60° C. for 15 minutes, and then the pH value is adjusted to 5.2 (Comparative Example 6) and 6.0 with sodium hydroxide, respectively. In the resulting water-soluble fraction, the yield is extremely reduced at a pH of 5.2. On the other, the purity of 7S is not increased at a pH value of 6.0. Therefore, neither of Comparative Examples can be fractionated with a high purity.

BRIEF DESCRIPTION OF THE DRAWINGS

FIG. 2 is a photograph which is a substitute for a drawing showing an electrophoretic pattern by SDS-polyacrylamide gel electrophoresis of a 7S-globulin fraction, a 11S-globulin fraction, and a lipophilic protein fraction.

Figure 1:
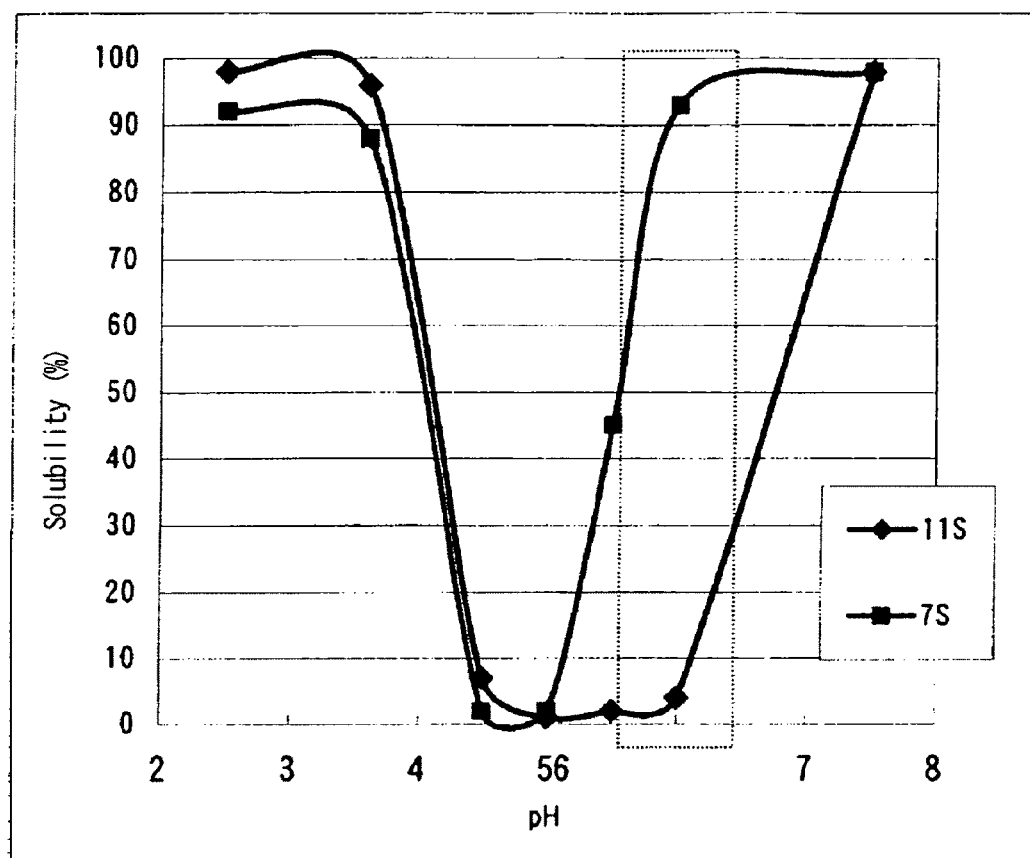
FIG. 1 is a graph showing dissolution behavior of 7S-globulin and 11S-globulin at each pH.

The invention claimed is:

1. A method for producing a non-7S/11S-acid-precipitable soybean protein material comprising the steps of:
   1) extracting proteins from a soybean having a 7S-globulin content of 20 wt % or more and a 11S-globulin content of 10 wt % or less relative to the total amount of proteins by dispersing the soybean in an aqueous solvent,
   2) removing a water-insoluble fraction from the extract by centrifugation, and recovering a water-soluble fraction to produce a soybean protein solution,
   3) adjusting the pH value of the soybean protein solution to 4 to 5.5, and heating the solution at 40 to 65° C.,
   4) adjusting the pH value of the heated soybean protein solution to a pH value ranging from 5.3 to 5.7 and higher than the pH value at the time of heating the solution, and fractionating the solution into a water-soluble fraction and a water-insoluble fraction, and
   5) recovering the water-insoluble fraction obtained in step 4.

* * * * *